(12) United States Patent
Seidel et al.

(10) Patent No.: US 9,574,315 B2
(45) Date of Patent: Feb. 21, 2017

(54) METHOD FOR ANCHORING A FOUNDATION STRUCTURE, AND FOUNDATION STRUCTURE

(71) Applicant: SENVION SE, Hamburg (DE)

(72) Inventors: Marc Seidel, Osnabrück (DE); Albrecht Victor, Osnabrück (DE)

(73) Assignee: Senvion SE, Hamburg (DE)

( * ) Notice: Subject to any disclaimer, the term of this patent is extended or adjusted under 35 U.S.C. 154(b) by 0 days.

(21) Appl. No.: 14/651,657

(22) PCT Filed: Nov. 13, 2013

(86) PCT No.: PCT/EP2013/003411
§ 371 (c)(1),
(2) Date: Jun. 11, 2015

(87) PCT Pub. No.: WO2014/090361
PCT Pub. Date: Jun. 19, 2014

(65) Prior Publication Data
US 2015/0368871 A1    Dec. 24, 2015

(30) Foreign Application Priority Data
Dec. 14, 2012  (DE) .......... 10 2012 024 412

(51) Int. Cl.
*E02D 27/42*        (2006.01)
*E02B 17/00*        (2006.01)
(Continued)

(52) U.S. Cl.
CPC ......... *E02D 27/425* (2013.01); *E02B 17/0008* (2013.01); *E02D 5/34* (2013.01);
(Continued)

(58) Field of Classification Search
CPC combination set(s) only.
See application file for complete search history.

(56) References Cited

U.S. PATENT DOCUMENTS

2005/0286979 A1    12/2005  Watchorn
2006/0185279 A1*    8/2006  Eusterbarkey .......... E02D 27/12
                                                                    52/292
(Continued)

FOREIGN PATENT DOCUMENTS

DE        10330963 A1    1/2005
GB         1497080 A      1/1978
(Continued)

*Primary Examiner* — Kyle Armstrong
(74) *Attorney, Agent, or Firm* — Rankin, Hill & Clark, LLP

(57) ABSTRACT

A method for anchoring a foundation structure (3) in a seabed (1) that includes introducing a receiving structure (6) into the seabed, lowering a support post (5) of the foundation structure (3) into the receiving structure (6), producing a connection between the receiving structure (6) and foundation structure (3) by filling the receiving structure (6) with a curable filling compound (7), and curing the curable filling compound (7), wherein the support post (5) is fixed in the receiving structure (6) prior to filling the receiving structure (6) with the curable filling compound (7). Also disclosed is a foundation structure (3) for an offshore wind turbine, for anchoring in a seabed (1), which includes at least one support post (5) to be introduced into a receiving structure (6), which has fixing elements (11, 20) for temporarily fixing in the receiving structure (6) before grouting is carried out.

16 Claims, 3 Drawing Sheets

(51) Int. Cl.
  *E02D 5/34* (2006.01)
  *E02D 27/12* (2006.01)
  *E02D 27/32* (2006.01)
(52) U.S. Cl.
  CPC .............. *E02D 27/12* (2013.01); *E02D 27/32* (2013.01); *F03D 13/22* (2016.05); *E02B 2017/0043* (2013.01); *E02B 2017/0091* (2013.01)

(56) References Cited

U.S. PATENT DOCUMENTS

2010/0050546 A1* 3/2010 Maekawa .............. E02D 5/808
  52/223.13
2011/0138731 A1  6/2011 Yoshimura et al.

FOREIGN PATENT DOCUMENTS

| JP | 2008285828 A | 11/2008 |
| WO | 2011/010937 A1 | 1/2011 |

* cited by examiner

METHOD FOR ANCHORING A FOUNDATION STRUCTURE, AND FOUNDATION STRUCTURE

The invention relates to a method for anchoring a foundation structure of a wind turbine, in particular for anchoring a foundation structure for an offshore wind turbine in the seabed, comprising the following steps: introducing at least one receiving structure into the ground, in particular into the seabed, lowering at least one support post of the foundation structure into the at least one receiving structure, producing a connection between the receiving and foundation structure by filling the receiving structure with a curable filling compound, and curing the curable filling compound.

The invention further relates to a foundation structure, in particular for anchoring in the seabed, comprising at least one support post to be introduced into a receiving structure.

Such a method is used inter alia for anchoring offshore wind turbines on the seabed. The filling of the receiving structure, for example formed by hollow piles, with a curing filling compound, for example a mortar or concrete, is referred to as grouting. Here, for example, a pile as receiving structure that is hollow on the side directed away from the seabed is introduced (for example bored or rammed) into the seabed. In particular on rocky subsoil, it is also possible for a borehole as receiving structure to be incorporated in the subsoil. Different foundation structures are known depending on the size of the wind turbine to be fastened. These are in particular so-called monopiles composed of one support post, tripods having three support posts, and so-called jackets having three or more support posts (also referred to as corner legs).

Since the foundation structure of the wind turbine is situated partly underwater and partly above water during the anchoring process, it is exposed to the action of waves. However, for the load-bearing capacity of the grouted connection between the receiving structure and foundation structure, it is crucial that, during the curing of the curable filling compound (the grout), which is usually high-strength concrete, there occurs no or only a slight relative movement between the receiving structure and, for example, the support post inserted into the receiving structure. Thus, for example, a maximum movement of 3 mm is specified as admissible in WO 2011/010937 A1.

WO 2011/010937 A1 describes a method for anchoring a plurality of support posts of a structure in a plurality of receiving piles, wherein the support posts are equipped with brackets which are supported on the pile openings when introducing the support posts into the piles. In order to be able to compensate for slight height differences between the pile openings of adjacent piles, elastic buffers are provided on the brackets. This construction is intended to prevent foundation structures with more than three support posts from carrying out destructive tilting movements which reduce the load-bearing strength.

At the present time, owing to the negative effects of relative movements in the curing phase, anchoring of foundation structures for wind turbines on the seabed can only be carried out when the sea is calm. Consequently, the anchoring operation can be considerably delayed in some cases because it is necessary to wait for suitable conditions, and it is even completely impossible in typical periods of poor weather.

It is therefore an object of the present invention to provide a method for anchoring a foundation structure of a wind turbine in the seabed, which method is less weather-dependent and less susceptible to waves. Furthermore, an object of the invention is to provide a foundation structure for a wind turbine for anchoring in the seabed, which foundation structure is particularly suitable for an anchoring operation using a less delicate method.

This object is achieved according to the invention by a method for anchoring a foundation structure of a wind turbine in the seabed, comprising the following steps: introducing at least one receiving structure into the seabed, lowering at least one support post of the foundation structure into the at least one receiving structure, producing a connection between the receiving and foundation structure by filling the receiving structure with a curable filling compound, and curing the curable filling compound, which method is developed in that the support post is fixed in the receiving structure prior to filling the receiving structure with the curable filling compound.

By fixing the support post in the receiving structure before filling with grout, movements of the support post relative to the receiving structure during the curing of the curable filling compound are reliably prevented. Here, the fixing can be configured in such a way that it can merely absorb the forces occurring with normal to medium waves, but is not designed to be suitable for absorbing still higher forces, as is required by the finally anchored foundation structure. At first, a provisional fixing operation as it were is carried out which facilitates the production of the final connection between the receiving structure and foundation structure.

If, according to a particular refinement of the invention, the fixing operation is achieved by means of fixing elements provided on the support post, this can be achieved in a particularly simple manner.

According to a further advantageous refinement of the invention, the fixing elements are designed as elastic fixing elements, for example metal sheets, positioned obliquely on the support post. According to a preferred development of the invention, these elements are offset in height with respect to one another in the direction of the longitudinal axis of the support post. The metal sheets can be braced in the receiving structure in the manner of a latch. Within the meaning of the invention, elastic metal sheets are understood to mean, for example, metal sheets which can be deflected relative to the support post without permanent deformation. This can be achieved via an elastic deformation of the metal sheets or via prestressed movable fastening.

According to an alternative refinement of the invention, the fixing operation is achieved by means of fixing elements provided on the receiving structure. These are preferably annular steel inserts. Particularly in cooperation with fixing elements provided on the support post, a very reliable fixing can thus be obtained.

In a preferred development of the invention, for fixing purposes, a pulling force acting counter to the direction of lowering of the support post is applied to the support post, preferably via tensioning wedges introduced between an upper edge of the receiving structure and a bracket with the function of a stopper plate that is provided on the support post. As a result, the fixing elements are braced firmly with respect to one another or with respect to the support post or with respect to the receiving structure and the fixing is particularly secure.

According to an alternative refinement of the method according to the invention, the support post is fixed in the receiving structure in an integrally bonded manner before the final filling operation. This is achieved in particular by means of a curable fixing compound, in particular a rapidly curing adhesive or mortar. Such an integrally bonded fixing can be produced with particularly simple means. By comparison with the filling compound to be introduced subsequently into the receiving structure, this fixing compound can, for example, have a shorter time for obtaining the required strength (setting time) and a lower load-bearing capacity. However, it is also possible in principle for the same compound to be used in both method steps, with a curing phase having to be observed in any event between the two filling steps.

According to a development of this method according to the invention, the fixing operation is assisted by anchor elements which are provided on the support post and which are embedded in the curable fixing compound after the latter has been introduced. Thus, in addition to the integral bonding, a positive-locking engagement can be produced temporarily between the receiving and the foundation structure, with the result that the reliability of the temporary fixing is further increased.

In principle, the load-bearing strength of integrally bonded connections produced by means of curing filling or fixing compounds is reduced by movements which take place during curing. However, for the method according to the invention, this can be tolerated to a certain extent since the cured fixing compound has to absorb only the forces occurring during the curing of the curable filling compound. It is sufficient that, in the method according to the invention, movements of the support post in the receiving structure during the curing of the curable filling compound are reduced. As also hitherto in the prior art, the required compressive strength and load-bearing capacity are provided after curing to the anchoring produced according to the invention by the filling compound, it being the case that the fixing compound can, but does not have to, make a contribution to this.

The fixing compound fixes the lower free end of the support post, which post can thus still be displaced in its unfixed region in the receiving structure. This can advantageously be avoided in that, according to further advantageous refinements of the invention, radially extending lug plates are arranged on the support post. These lug plates are arranged in a height region on the support post which, in the inserted state, lies within the receiving structure, but above the support post region embedded in the fixing compound. In an alternative to this, or in addition, the support post can have a bracket as stopper plate which, in the inserted state, bears frictionally on the upper end of the receiving structure.

The object is further achieved by a foundation structure for a wind turbine for anchoring in the seabed, comprising at least one support post to be introduced into a receiving structure, which foundation structure is developed in that the support post has fixing elements for fixing in the receiving structure.

With regard to further advantageous refinements of the invention, reference is made to what has been stated above and to the subclaims to avoid repetitions.

The invention will be explained in more detail below by means of some exemplary embodiments which are illustrated schematically in the figures and not to scale, in which.

Figure 1:
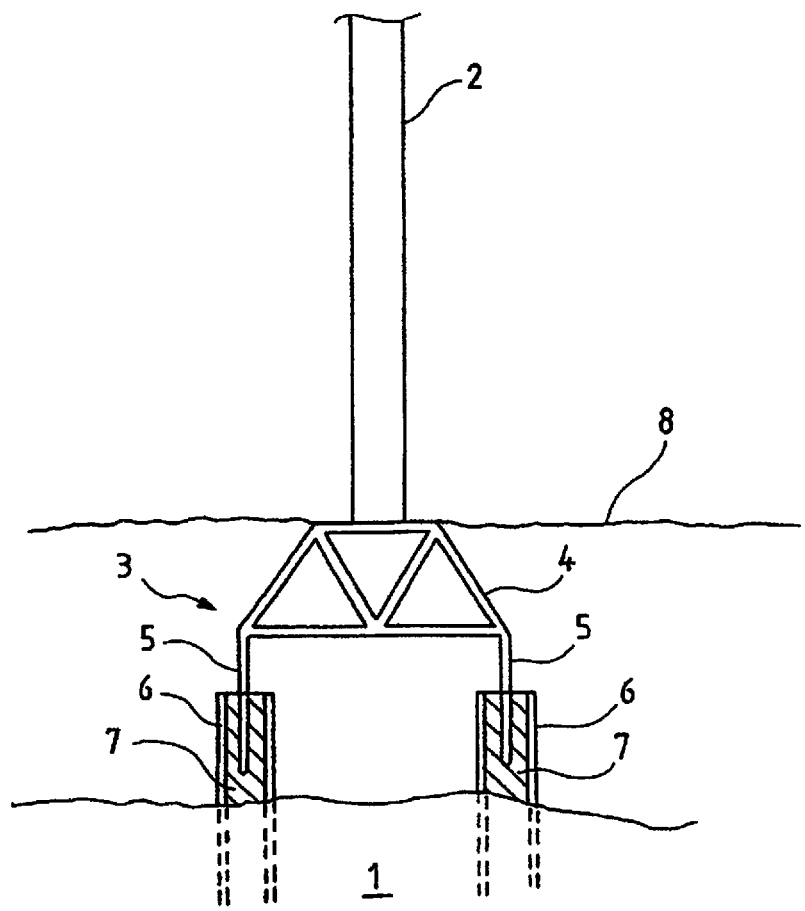
FIG. 1 shows a schematic illustration of an anchoring of a wind turbine in the seabed.

FIG. 1 is a schematic illustration showing a generic arrangement for anchoring an offshore wind turbine in the seabed 1. The tubular tower 2 of the wind turbine, which is not otherwise illustrated, is erected on a lattice-shaped foundation structure 3. This foundation structure 3 comprises a lattice framework body 4 and a plurality of support posts 5 which extend downward in a vertical direction. Depending on the size of the wind turbine, the foundation structure can be designed as a monopile with one support post, as a tripod with three support posts or as a jacket with three or more support posts. In the exemplary embodiment illustrated, the foundation structure 3 is designed as a jacket with four support posts 5, of which only two are illustrated for reasons of clarity. If designed as a monopile, the framework body 4 would be dispensed with, with the result that the foundation structure would merely comprise the support post itself.

In order to anchor the foundation structure 3 in the seabed 1, the support posts 5 are introduced by their free ends into receiving structures which, in the example illustrated, are designed as hollow foundation piles 6. These foundation piles 6 are sunk into the seabed 1; depending on the nature of the seabed 1, this can take place for example by ramming or boring. In particular with a very rocky seabed 1, it is possible, in place of the foundation piles, for bore holes (not shown) as receiving structure to be made in the ground.

In order to be able to absorb the forces occurring during the operation of the wind turbine, after introducing the support posts 5 into the receiving structures 6, the annular gap remaining in between is filled with a curable filling compound 7, which is then cured. This operation is referred to as grouting. The curable filling compound used is mainly high-strength concrete which, during assembly, is pumped from an assembly ship (not shown) into the receiving structure 6 via a grout line.

The foundation structure 3 is situated partly above and partly below the water surface 8. During the curing of the concrete, which lasts from several hours to days, the support posts 5 of the foundation structure 3 must not move very much since otherwise the strength of the concrete will become impaired. The prior art cannot ensure that strong movements do not occur in heavy seas. The movements are predominantly induced into the foundation structure by wave movements.

Figure 2:
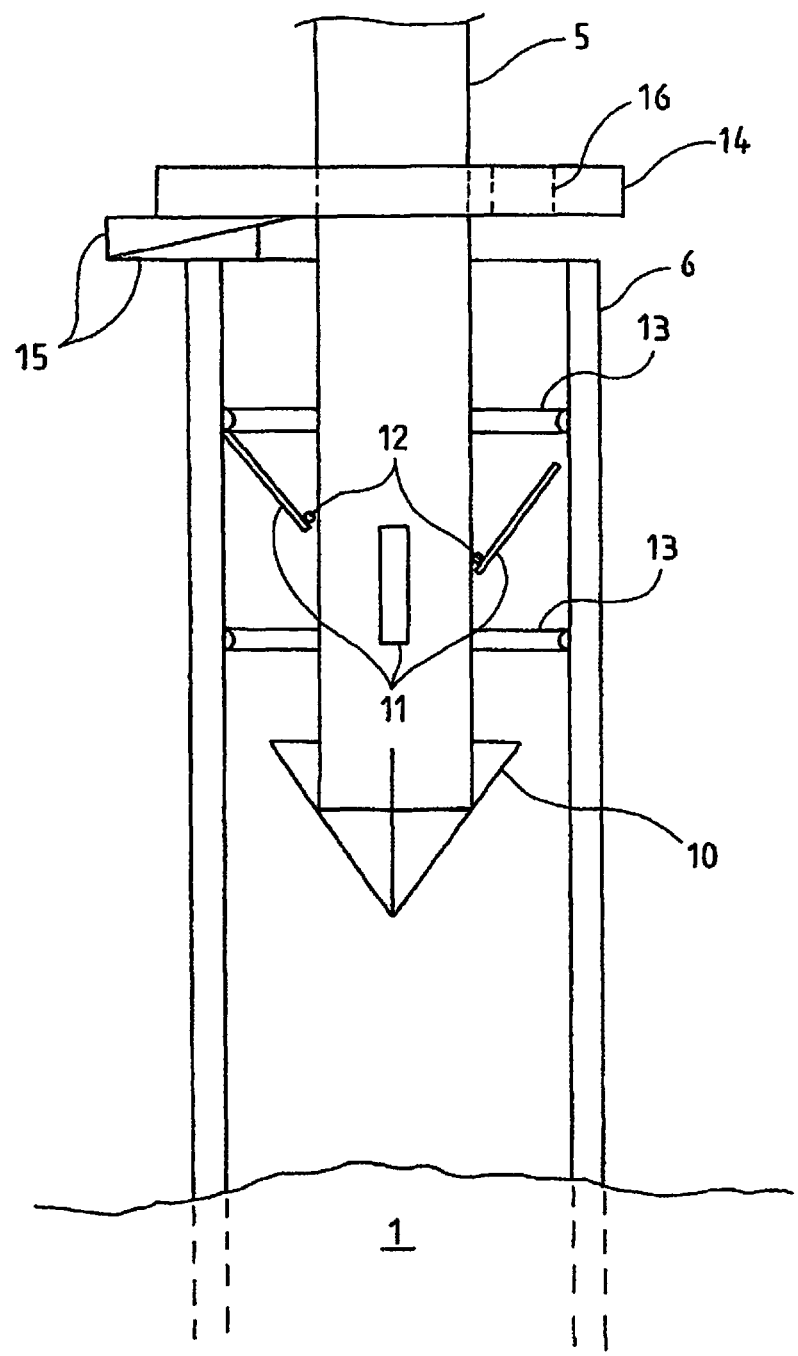
FIG. 2 shows a schematic illustration of an anchoring to be produced by a method according to the invention.

FIG. 2 is a schematic view illustrating an anchoring arrangement for a foundation structure for a wind turbine in which movements of the support posts 5 during curing cannot occur or at least no longer to the previous extent. Illustrated once again is a receiving structure which is designed as a hollow foundation pile 6 and which is sunk in the seabed 1. A support post 5 of the foundation structure, which is not shown further in this illustration of FIG. 2, is introduced into the foundation pile 6.

Lug plates 10 are arranged on the free end of the support post 5. These lug plates serve, on the one hand, for easier introduction of the support post 5 into the foundation pile 6 and, on the other hand, they ensure a minimum spacing between the support post 5 and foundation pile 6 in all directions which is necessary for firm grouting.

A plurality of fixing elements in the form of obliquely positioned metal sheets 11 are mounted by means of prestressed movable fastenings 12 on the circumference of the support post 5. Here, the prestressing is selected such that the metal sheets are pressed outwards in the direction of the inner wall of the foundation pile. The metal sheets 11 are arranged with a height offset with respect to one another in the longitudinal direction of the support post 5. Instead of a prestressing, the fastenings can also be designed such that the metal sheets 11 tilt outwardly by virtue of their own weight.

Fixing elements in the form of annular steel inserts 13 are also provided on the inner wall of the foundation pile 6. These steel inserts 13 are connected to the foundation pile in a suitable manner, for example by welding. The shear keys known in the prior art can also serve as steel inserts 13 and can be used to achieve the load-bearing strength of the grouted connection.

When the support post 5 is lowered downward into the foundation pile 6, the metal sheets 11 slide along the inner wall of the foundation pile 6 and beyond the steel inserts 13. As soon as the support post has reached its desired position, a pulling force acting counter to the direction of lowering can be exerted on the support post 5. For this purpose, tensioning wedges are pressed in between the upper end of the foundation pile 6 and a bracket with the function of a stopper plate 14 that is fastened to the support post 5. The upwardly acting pulling force causes the metal sheets 11 to engage behind the steel inserts 13, with the result that the support post 5 is firmly braced in the foundation pile 6 and cannot move or can barely still move under the influence of the forces acting under normal seas on the foundation structure 3.

In principle, it is possible to dispense with the steel inserts 13 if the metal sheets 11 are designed such that they brace themselves against the foundation pile 6 in a self-locking manner. If the foundation structure 3 is anchored in boreholes in the ground instead of in foundation piles 6, the steel inserts 13 are inevitably dispensed with. In this case, the metal sheets 11 are, usually without difficulty, braced against unevennesses of the inner wall of the borehole.

A grout line is then laid through an opening 16 provided in the bracket with the function of a stopper plate 14, or use is made of an already pre-installed grout line through which the filling compound (for example concrete) is then pumped into the interior of the foundation pile 6. This filling compound can cure at rest until the desired strength has been achieved.

Figure 3:
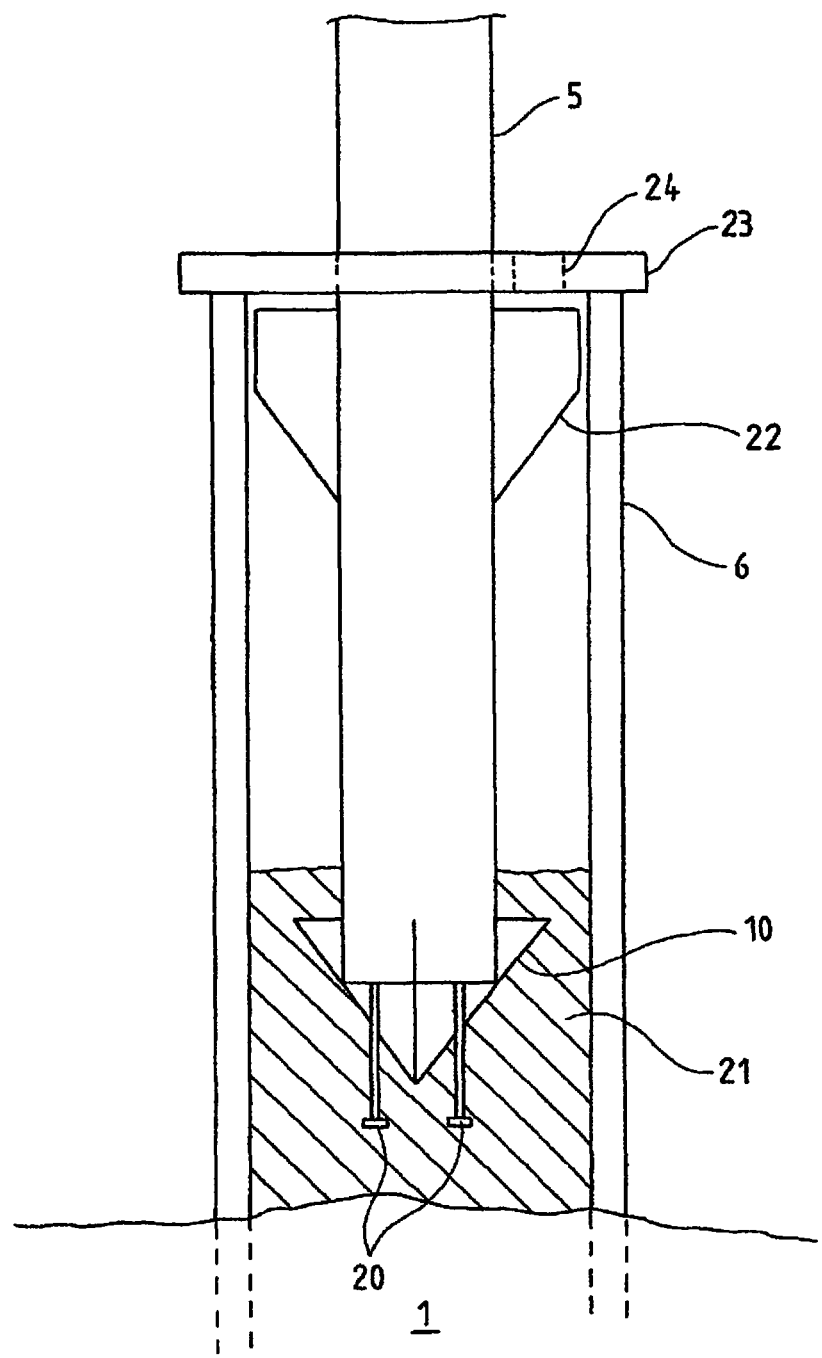
FIG. 3 shows a schematic illustration of an anchoring to be produced by a method according to a further refinement of the invention.

FIG. 3 illustrates an alternative anchoring arrangement, with corresponding elements being provided with identical reference signs in FIGS. 2 and 3.

Illustrated again is a foundation pile 6 which is sunk into the seabed 1. A support post 5 is lowered into the foundation pile 6. In addition to the customary lug plates 10, anchor elements 20 are fastened to the underside of the support post 5. These can be, for example, sufficiently long mounting screws 20 which are screwed by the downwardly pointing screw head into the end side of the support post 5.

As a departure from the method described in relation to FIG. 2, after lowering the support post 5 into the foundation pile 6, a quickly curing fixing compound 21 is pumped into the lower region of the interior of the foundation pile 6. This fixing compound may be, for example, quickly setting mortar, but adhesives such as epoxy adhesives or cyanoacrylate also come into consideration. What is crucial is that the quickly curing fixing compound fixes the lower end of the support post 5 with sufficient strength in a short period of time. The filling height of the fixing compound 21 illustrated in FIG. 3 is chosen only by way of example. Should the required strength require, for example, that the approximately complete length of the support post 5 lowered into the foundation pile 6 is filled with the filling compound, the fixing compound 21 can be filled only to such an extent that only the anchor elements 20 are embedded in the fixing compound 21.

Since a very high endurance strength is not required for this fixing, movements of the support post 5 during curing can be tolerated. Nevertheless, to reduce such movements, further lug plates 22 and a head plate 23 are fastened to the support post 5, which head plate acts to inhibit movement by friction on the upper end of the foundation pile 6. These lug plates 22 and/or the head plate 23 could also be advantageously provided in the exemplary embodiment of FIG. 2.

Again provided in the head plate 23 is an opening 24 through which a grout line can be laid in order to introduce the quickly setting fixing compound 21 and subsequently the filling compound (for example concrete).

After the quickly curing fixing compound 21 has cured, the foundation pile 6 is in turn filled with filling compound (for example concrete) which can cure at rest until it reaches its full strength.

The invention claimed is:

1. A method for anchoring a foundation structure in a seabed, comprising:
   introducing at least one receiving structure into the seabed,
   lowering at least one support post of the foundation structure into the at least one receiving structure,
   producing a connection between the receiving structure and foundation structure by filling the receiving structure with a curable filling compound, and
   curing the curable filling compound,
   wherein the at least one support post is fixed in the receiving structure via a fixing operation prior to filling the receiving structure with the curable filling compound;
   wherein the fixing operation is achieved by means of fixing elements arranged on the support post; and
   wherein the fixing elements arranged on the support post are metal sheets positioned obliquely relative to a longitudinal axis of the support post, and
   wherein the metal sheets are deflectable relative to the support post without permanent deformation via elastic deformation of the metal sheets or via pre-stressed movable fastenings.

2. The method as claimed in claim 1, wherein the metal sheets are arranged with a height offset with respect to one another in a direction of the longitudinal axis of the support post.

3. The method as claimed in claim 1, wherein achievement of the fixing operation is improved by means of additional fixing elements arranged on the receiving structure.

4. The method as claimed in claim 3, wherein the additional fixing elements arranged on the receiving structure are in the form of annular steel inserts.

5. The method as claimed in claim 1, wherein, for fixing purposes, a pulling force acting counter to a direction of lowering of the support post is exerted on the support post before the receiving structure is filled with the filling compound.

6. The method as claimed in claim 5, wherein the pulling force is applied via tensioning wedges introduced between an upper edge of the receiving structure and a stopper plate that is provided on the support post.

7. The method as claimed in claim 1, wherein, prior to filling the receiving structure with the curable filling compound, the support post is fixed in the receiving structure in an integrally bonded manner.

8. The method as claimed in claim 7, wherein the fixing operation is achieved by means of a curable fixing compound.

9. The method as claimed in claim 8, wherein the support post has arranged on it anchor elements which are embedded in the curable fixing compound after the curable fixing compound has been introduced.

10. The method as claimed in claim 8, wherein movements of the support post in the receiving structure during curing of the fixing compound are reduced by fixing means.

11. The method as claimed in claim 10, wherein movements of the support post are reduced by means of lug plates as fixing means provided on the support post.

12. The method as claimed in claim 10, wherein movements of the support post are reduced by means of a head plate as fixing means provided on the support post and bearing frictionally on an upper end of the receiving structure.

13. The method as claimed in claim 8, wherein the curable fixing compound is a rapidly curing adhesive or mortar.

14. A foundation structure for an offshore wind turbine, for anchoring in a seabed, comprising at least one support post to be introduced into a receiving structure, wherein the support post has fixing elements for temporarily fixing in the receiving structure before grouting is carried out, wherein the fixing elements arranged on the support post are metal sheets positioned obliquely relative to a longitudinal axis of the support post, and wherein the metal sheets are deflectable relative to the support post without permanent deformation via elastic deformation of the metal sheets or via pre-stressed movable fastenings.

15. The foundation structure as claimed in claim 14, wherein the metal sheets are arranged with a height offset with respect to one another in a direction of a longitudinal axis of the support post.

16. The foundation structure as claimed in claim 15, wherein a stopper plate is provided on the support post.

* * * * *